(12) United States Patent
Gathman et al.

(10) Patent No.: US 12,086,133 B1
(45) Date of Patent: Sep. 10, 2024

(54) ENHANCED SEARCH UTILITY

(71) Applicant: Wells Fargo Bank, N.A., San Francisco, CA (US)

(72) Inventors: Michael David Gathman, Fort Mill, SC (US); Arun Kallikadavil, Charlotte, NC (US); Rajesh Kumar, Concord, NC (US); Vinay Purohit, Weddington, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 14 days.

(21) Appl. No.: 18/063,274

(22) Filed: Dec. 8, 2022

(51) Int. Cl.
*G06F 16/242* (2019.01)
*G06F 16/2457* (2019.01)

(52) U.S. Cl.
CPC ...... *G06F 16/2428* (2019.01); *G06F 16/2423* (2019.01); *G06F 16/24573* (2019.01)

(58) Field of Classification Search
CPC .......... G06F 16/2428; G06F 16/24573; G06F 16/2423; G06F 16/248; G06F 3/0482; G06F 40/174; G06F 16/2457; G06F 16/26; G06F 16/2358; G06F 16/22; G06F 16/951; G06F 16/215; G06F 16/24528; G06F 3/04842; G06F 11/3082; G06F 16/337; G06F 16/2465; G06F 3/048
USPC ....................................................... 707/769
See application file for complete search history.

(56) References Cited

U.S. PATENT DOCUMENTS

| | | | |
|---|---|---|---|
| 2013/0173604 A1* | 7/2013 | Li | G06F 16/9538 707/723 |
| 2014/0006393 A1* | 1/2014 | Soshin | G06F 16/00 707/E17.014 |
| 2015/0160847 A1* | 6/2015 | Waisbein | G06F 16/2457 715/763 |
| 2016/0147780 A1* | 5/2016 | Zhiyanov | G06F 16/5838 707/706 |
| 2016/0147869 A1* | 5/2016 | Ford | G06F 16/288 707/740 |
| 2016/0224993 A1* | 8/2016 | Miller | G06F 16/24556 |
| 2017/0139924 A1* | 5/2017 | Avera | G06Q 40/06 |
| 2017/0322985 A1* | 11/2017 | Boe | H04L 41/5032 |
| 2018/0322198 A1* | 11/2018 | Elkherj | G06F 16/38 |
| 2021/0248136 A1* | 8/2021 | Panuganty | G06F 16/972 |

* cited by examiner

*Primary Examiner* — Evan Aspinwall
(74) *Attorney, Agent, or Firm* — SCHWEGMAN LUNDBERG & WOESSNER, P.A.

(57) ABSTRACT

Examples are directed to systems and methods that cause a first user interface having an input field that receives a search query to be displayed. A search query having an attribute of a first entity is received at the input field. Data records are searched for a second entity using the attribute when the search query is received. A second user interface is displayed that has a data record for the second entity. The data record lists the attribute and an additional attribute of the second entity. The second user interface has a drill down user interface that lists the attribute and the additional attribute. The attribute and the additional attribute are selectable to reconfigure the second user interface. The second user interface has a selectable option to create a new data record where the option corresponds to an indication that the first entity is different from the second entity.

20 Claims, 10 Drawing Sheets

FIG. 3

SEARCH AND CREATE ENTITY — 202

ENTER SEARCH CRITERIA

[SEARCH] — 208
☐ DUPLICATE  ☐ CHANGE CRM  ☐ PPP BORROWING  ☒ ALL DATABASES  ☐ CREATE NEW DATA RECORD

APPLIED FILTERS: STATUS

| ENTITY DETAILS | FORMATION DOCS | LOAN DOCS | FINANCIAL STATEMENTS |
|---|---|---|---|

| STATUS | LEGAL NAME | TRADE STYLE NAME | CITY | STATE | TAX ID | DUNS NUM | # OF EMPLOYEES | SALES VOLUME | NAICS CODE | NAICS DESCRIPTION |
|---|---|---|---|---|---|---|---|---|---|---|
| ACTIVE | ABC PAINTING | ALEXIS CARBERRY | FORT MILL | SOUTH CAROLINA | XXX-XX-8227 | 80624581 | | 153,834 | 238320 | PAINTING AND WALL COVERING CONTRACTORS |
| ACTIVE | ACME PAINTING | | FORT MILL | SOUTH CAROLINA | XXX-XX-1738 | 79711787 | | 175,355 | 238320 | PAINTING AND WALL COVERING CONTRACTORS |
| SUSPENDED | ANTHONY'S PAINTING | FORT MILL PAINTERS | FORT MILL | SOUTH CAROLINA | XXX-XX-9608 | 98698893 | | 175,355 | 238320 | PAINTING AND WALL COVERING CONTRACTORS |
| | BLUE JACKET PAINTING COMPANY INC | | FORT MILL | SOUTH CAROLINA | | 77191024 | | 175,355 | 238320 | PAINTING AND WALL COVERING CONTRACTORS |
| | BRIAN HELMS | | FORT MILL | SOUTH CAROLINA | | 22854529 | | 42,857 | 238320 | PAINTING AND WALL COVERING CONTRACTORS |
| | CERTAPRO PAINTERS OF ROCK HILL SC | | FORT MILL | SOUTH CAROLINA | | 114296597 | | 42,857 | 238320 | PAINTING AND WALL COVERING CONTRACTORS |
| | COMMERCIAL COATINGS INC | | FORT MILL | SOUTH CAROLINA | | 103595465 | | 50,392 | 238320 | PAINTING AND WALL COVERING CONTRACTORS |
| | CAPRICE PAINTING PAUL A | | FORT MILL | SOUTH CAROLINA | | 78242431 | | 100,000 | 238320 | PAINTING AND WALL COVERING CONTRACTORS |
| | CUSTOMERS COLORS PAINTING | | FORT MILL | SOUTH CAROLINA | | 47264140 | | 42,857 | 238320 | PAINTING AND WALL COVERING CONTRACTORS |
| | DAVE DEVAULT PAINTING INC | | FORT MILL | SOUTH CAROLINA | | 80645464 | | 875,460 | 238320 | PAINTING AND WALL COVERING CONTRACTORS |
| | EFFICIENT CONTRACTORS, INC | | FORT MILL | SOUTH CAROLINA | | 73892434 | | 55,926 | 238320 | PAINTING AND WALL COVERING CONTRACTORS |
| | GO PAINTING LLC | | FORT MILL | SOUTH CAROLINA | | 26094942 | | 42,857 | 238320 | PAINTING AND WALL COVERING CONTRACTORS |
| | GLS PAINTING & REMODELING LLC | | FORT MILL | SOUTH CAROLINA | | 149306354 | | 72,656 | 238320 | PAINTING AND WALL COVERING CONTRACTORS |
| | JEFF WOODS PAINTING INC | | FORT MILL | SOUTH CAROLINA | | 36606571 | | 124,890 | 238320 | PAINTING AND WALL COVERING CONTRACTORS |
| | PRECISION PAINTING LLC | | FORT MILL | SOUTH CAROLINA | | 75452277 | | 42,857 | 238320 | PAINTING AND WALL COVERING CONTRACTORS |
| | PREFERRED CONTRACTING SERVICES | | FORT MILL | SOUTH CAROLINA | | 852105162 | | 151,664 | 238320 | PAINTING AND WALL COVERING CONTRACTORS |
| | QUEEN CITY HOME SERVICES LLC | | ROCK HILL | SOUTH CAROLINA | | 41474414 | | 42,857 | 238320 | PAINTING AND WALL COVERING CONTRACTORS |
| | ROBY PAINTING LLC | | ROCK HILL | SOUTH CAROLINA | | 74905426 | | 42,857 | 238320 | PAINTING AND WALL COVERING CONTRACTORS |
| | ROYCE'S PAINTING LLC | | FORT MILL | SOUTH CAROLINA | | 72525896 | | 63,108 | 238320 | PAINTING AND WALL COVERING CONTRACTORS |
| | TIM SMITH PAINTING LLC | | FORT MILL | SOUTH CAROLINA | | 47339651 | | 71,238 | 238320 | PAINTING AND WALL COVERING CONTRACTORS |
| | TYLER PAGE ENTERPRISES | | ROCK HILL | SOUTH CAROLINA | | 852105162 | | 56,000 | 238320 | PAINTING AND WALL COVERING CONTRACTORS |
| | WILLIAM D EDWARDS | EDWARDS PAINT COMPANY | ROCK HILL | SOUTH CAROLINA | | 167235816 | | 42,857 | 238320 | PAINTING AND WALL COVERING CONTRACTORS |
| | WYLIE TOTHEROH DOMESTICS | | FORT MILL | SOUTH CAROLINA | | 12632085 | | | 238320 | PAINTING AND WALL COVERING CONTRACTORS |

RESULT FILTERS
- CITY > 2
- STATE > 1
- ZIP > 5
- COUNTRY > 1
- STATUS
- INDUSTRY > 3
- SECTOR > 4
- NAICS CODE > 20
- LEGAL TYPE > 5
- RM > 4
- LOB > 3
- EXISTING ENTITY > 2
  - CUSTOMER  3
  - PROJECT  2

FIG. 4

SEARCH AND CREATE ENTITY 202

ENTER SEARCH CRITERIA

[SEARCH] 210  ☐ CHANGE CRM  ☒ ALL DATABASES 208

338 ☐ DUPLICATE  336 ☐ CREATE NEW DATA RELOAD 334

APPLIED FILTERS: [STATUS]

| ENTITY DETAILS | WCISD | FORMATION DOCS | LOAN DOCS | FINANCIAL STATEMENTS | PPP BORROWING | CRM | | | | | 302 |
|---|---|---|---|---|---|---|---|---|---|---|---|
| CUSTOMER VS PROSPECT | CUSTOMER STATUS | EXIST IN CRM | LEGAL NAME | TRADE STYLE NAME | CITY | STATE | TAX ID | DUNS NUM | # OF EMPLOYEES | SALES VOLUME | NAICS CODE | NAICS DESCRIPTION |
| C | ACTIVE | | MAGUIRE'S PAINTINGS | MAC PAINTING | FORT MILL | SOUTH CAROLINA | XXX-XX-XXX | | | | | PAINTING AND WALL COVERING CONTRACTORS |

308 316
RESULT FILTERS
CITY > 1
STATE > 1
ZIP > 0
COUNTRY > 0
310
STATUS > 0
INDUSTRY > 0
SECTOR > 0
NAICS CODE > 0
314
LEGAL TYPE > 0
RM > 0
LOB > 0
EXISTING ENTITY > 1
  CUSTOMER  0
  PROJECT  0
318

ENHANCED SEARCH UTILITY

BACKGROUND

Multiple users may enter data relating to the same entity at different times across different platforms. The data can include a trade name of an entity, a legal name of an entity, a physical address of an entity, a correspondence address of an entity, a point of contact associated with an entity, and/or a tax identification (tax id) associated with an entity. A first user may enter first data for an entity at a first customer relation management database to create a first record. The first data may only include a first point of contact and a legal name of an entity. A second user may enter second data for the same entity at a second customer relation management database to create a second record. Here, the second user may enter a second contact associated with the same entity along with a physical address of the entity. Additionally, a third user may enter third data for the same entity at a third customer relation management database to create a third record. The user may enter a third contact associated with the entity along with a correspondence address of the entity. In this scenario, three different entries exist for the same entity.

At a later time, a fourth user may perform a search for the same entity where search data input by the fourth user includes a trade name of the entity, the legal name of the entity, and a tax id for the entity. Here, the first through third records may be provided to the fourth user in response to the search. However, beside the legal name, none of the first through third records have the tax id associated with the entity. Thus, the fourth user may decide to make a fourth record for the same entity such that there are four different records each having different data for the same entity. Furthermore, when the first through third records are provided to the fourth user, a separate platform, such as a master platform, may begin to assimilate the information from the first through third records with the fourth user data. However, this can waste network resources and slow down the process of the fourth user obtaining pertinent search results, i.e., the data associated with the same entity.

Therefore, what is needed is a system and method that solves the problems of users entering disparate information associated with the same entity such that entries for the same entity are stored multiple times. The system and method should be able to help a user create a record for an entity and help a user find an existing record for an entity.

SUMMARY

Examples relate to a system that can receive a search query for an entity and output results based on the search query. The system can present a first user interface that allows a user to enter data for the search query, the data being associated with the entity. In response to receiving the data at the first user interface, the system can search for data records associated with the entity. Based on the results found during the search, the system can present a second user interface that displays data records corresponding to the entity.

The second user interface can display a plurality of entities having first attributes that correspond to the data entered for the search query and second attributes associated with the plurality of entities. The second user interface can also display an interactive drill down menu. The interactive drill down menu can include the first attributes and the second attributes. The first and second attributes can be selectable to rearrange the display of the plurality of entities having the first attributes and/or the second attributes.

The second user interface can be configured to allow for a determination regarding whether or not a data record has been established for the entity associated with the search query. If a determination is made that none of the returned data records correspond to the entity associated with the search query, the system can run a second search based on the determination that none of the returned data records correspond to the entity associated with the search query. In examples, if a data record is not found that corresponds to the entity associated with the search query, a data record can be created for the entity.

BRIEF DESCRIPTION OF FIGURES

FIG. 3 shows a user interface output in response to receiving a search query of the user interface in FIG. 2, in accordance with some examples.

FIG. 4 illustrates a user interface output in response to filtering attributes listed on the user interface in FIG. 3, in accordance with some examples.

FIG. 7 is a user interface that illustrates a data record, in accordance with some examples.

DETAILED DESCRIPTION

Examples relate to a system that can provide smart searching capabilities that provide a comprehensive search of entities and relationships among the entities across multiple sources. The entities can correspond to legal entities, such as corporate entities. The sources can include internal and external sources. In addition, the system can include rules for entering information into the system relating to legal entities.

To further illustrate, a customer relations manager (CRM) associated with an organization can use the system to search for a legal entity. As described herein, a CRM can be a user. Therefore, for purposes of this disclosure, any reference to the term "user" can also be a reference to the term "CRM." Likewise, any reference to the term "CRM" can be a reference to the term "user." The CRM can enter information associated with the legal entity into the system as a search query. The system can search sources that are internal to the organization and sources that are external to the organization for the legal entity. The system can return any results relating to the legal entity to the CRM at a user interface. The results can pertain to a number of legal entities that include the information entered by the CRM The user interface can display differences between the found legal entities in addition to similarities among the found legal entities. The user interface can provide a drill down menu that allows the CRM to filter the search results. The user interface can also provide an input that allows the CRM to indicate whether or not any of the returned search results correspond to the legal entity for which the CRM conducted the search.

If the CRM provides an indication that none of the returned search results correspond to the legal entity which is being searched for by the CRM, the CRM can create a new data record in accordance with rules for entering information into the system. The rules can indicate minimum information in order to allow for consistent information across data records for different legal entities, which should be provided in order to create the new data record. Once the CRM creates the new data record, a second search can be conducted using the information provided in the new data record to confirm that no matches exist for the searched legal entity. If a match does not exist, then the new data record for the legal entity can be created. If a determination is made that a match does exist, the information provided by the CRM when creating the new data record can be merged with the information associated with the legal entity that matches the information provided in the new data record.

Figure 1:
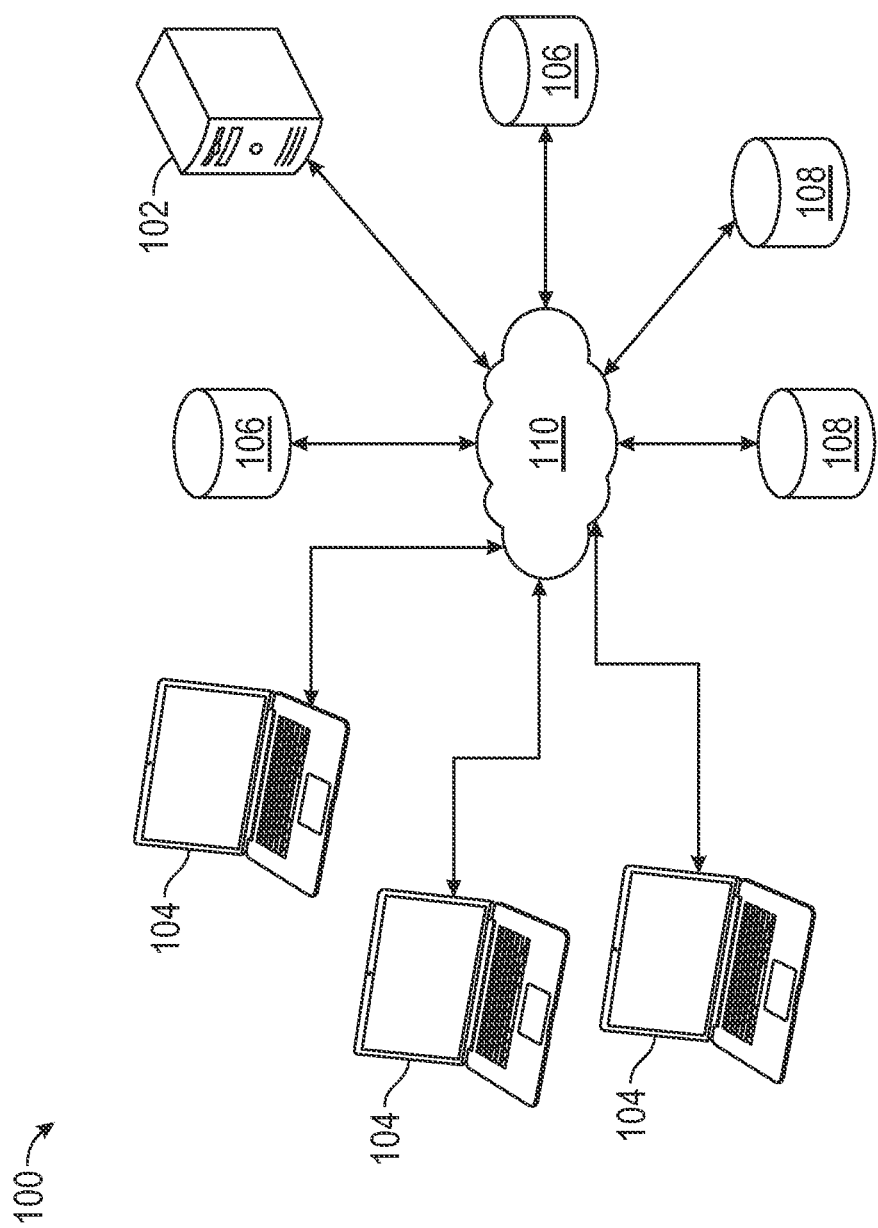
FIG. 1 shows an environment in which examples may operate, in accordance with some examples.

Now making reference to FIG. 1, an environment 100 is shown in which examples can operate. The environment 100 can include a search system 102, CRM devices 104, internal databases 106, and external databases 108. The environment 100 can also include a network 110, which can facilitate communication between the search system 102, the CRM devices 104, the internal databases 106, and the external databases 108.

The search system 102 and the CRM devices 104 can incorporate an architecture that facilitates operation in the capacity of either a server of a client machine in server-client network environments, where each of these devices may be implemented as any type of computing device, such as a server computer, a personal computer (PC), or the like each having a processor configured to perform the subject matter disclosed herein. The CRM device 104 can be any computing device suitable for use by a user. For example, the devices may be a desktop computer, a tablet computer, a portable media device, or a smart phone belonging to a user.

The internal databases 106 and the external databases 108 can be any data storage resource and may store data structured as a text file, a table, a spreadsheet, a relational database (e.g., an object-relational database), a triple store, a hierarchical data store, or any suitable combination thereof. Moreover, any two or more of the internal databases 106 or the external databases 108 can be combined into a single machine, database, or device, and the functions described herein for any single machine, database, or device may be subdivided among multiple machines, databases, or devices.

The internal database 106 can include attributes, such as identifying information, associated with legal entities. These attributes can include a legal name of a legal entity, a trade name of a legal entity, or a trade style name of a legal entity. The attributes can also include an internal database identifier and a tax identification (tax id). The attributes can also be a social security number or an identification associated with an external identification, such as a Data Universal Numbering System (DUNS) number. Moreover, the attributes can include address information, such as street, city, state, country, zip code, and the like, associated with the legal entity. In addition to the examples listed herein, the attributes can also correspond to any type of information that can be used to identify an entity.

The internal databases 106 can store documents associated with legal entities. These documents can include documents associated with the formation of a legal entity, financial statements associated with a legal entity, and loan documents associated with a legal entity. The documents stored at the internal databases 106 can also include paycheck protection program (PPP) borrowing documents associated with a legal entity, W-9 documents associated with a legal entity, and the like. The documents can also include entity details relating to a legal entity, such as year of creation of the legal entity, a size of the legal entity, the number of locations of the legal entity, and the like. Each of these documents can be stored in a manner where storage is spread among different ones of the internal databases or these documents can be stored at a single one of the internal databases. In addition to the types of documents listed herein, the internal databases 106 can store any other type of document associated with a legal entity.

The internal databases 106 can store information that can be used to generate a personal dashboard associated with a CRM who is initiating a search on the search system 102 and the internal databases 106 and the external databases 108. A CRM can be associated with various legal entities that can include the attributes listed above. Various legal entities can relate to potential associations for a CRM. A potential association can relate to a potential relationship between a CRM and the legal entity. Artificial intelligence can be used to assign a score to the various legal entities that can be a potential association with the CRM. The score can be based on a comparison between the attributes of the legal entities that can potentially be associated with the CRM and the attributes of legal entities already associated with the CRM. Based on the scores, the legal entities that can potentially be associated with the CRM can be ranked and then presented to the CRM on the personal dashboard.

The internal databases 106 can store information relating to CRMs having relationships with legal entities. In some situations, a first legal entity may have two subsidiaries, which can be considered second and third legal entities separate and distinct from the first legal entity. A first CRM can have a relationship with the first legal entity while a second CRM can have a relationship with the second legal entity and a third CRM can have a relationship with the third legal entity. This information can be stored in the internal databases 106.

The network 110 can be any network that enables communication between or among machines, databases, and devices (e.g., the search system 102, the CRM devices 104, the internal databases 106, and the external databases 108). Accordingly, the network 110 can be a wired network, a wireless network (e.g., a mobile or cellular network), or any suitable combination thereof. The network 110 may include one or more portions that constitute a private network, a public network (e.g., the Internet), or any suitable combination thereof. Accordingly, the network 110 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 110 can communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
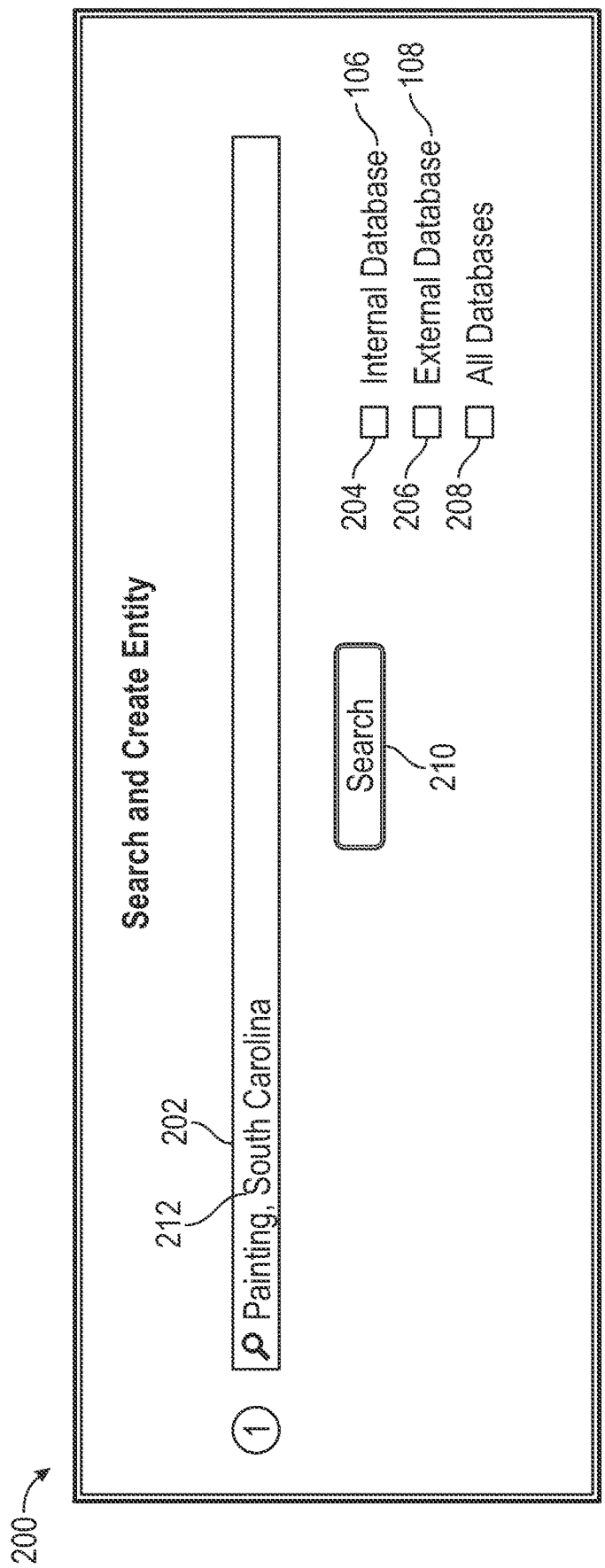
FIG. 2 is a user interface configured to receive a search query from a user, in accordance with some examples.

The search system 102 can be accessed by a user via one of the CRM devices 104 to conduct a search of the internal databases 106 and the external databases 108 for a legal entity. In particular, the search system 102 can provide a user interface 200 on one of the CRM devices 104 that allows a user associated with one of the CRM devices 104 to begin a search of a legal entity, as shown with reference to FIG. 2. The user interface 200 can include an input field 202 within which a user can input a search query. Examples of search queries that can be entered at the input field 202 can include attributes associated with a legal entity, as described above.

The user interface 200 can include selectors 204-208, which can correspond to which databases the user would like to be searched. The selector 204 can correspond to the internal databases 106 such that if the selector 204 is engaged, only the internal databases 106 will be searched using the attributes entered at the input field 202. The selector 206 can correspond to the external databases 108 such that if the selector 206 is engaged, only the external databases 108 will be searched using the attributes entered at the input field 202. The selector 208 can correspond to the internal databases 106 and the external databases 108 such that if the selector 208 is engaged, the internal databases 106 and the external databases 108 will be searched using the attributes entered at the input field 202. The user interface 200 can also include a selector 210 which a user can engage to conduct a search of the internal databases 106 and external databases 108 after the user inputs a search query at the input field 202. The selectors 204-210 can be a radio button, a slider, or any other type of mechanism.

After the search system 102 conducts a search of legal entities having attributes that match the attributes entered at the input field 202, the search system 102 can provide a user interface 300 that can show legal entities found during the search conducted on the databases, such as the internal databases 106 and the external databases 108, selected in the user interface 200, as shown with reference to FIG. 3. Here, the user interface 300 can include a data record 302 that lists the found legal entities along with attributes 304-314 associated with the found legal entities. The attributes 304-314 can correspond to the attributes entered by the user at the input field 202 in addition to other attributes associated with the found legal entities. The legal entities listed in the data record 302 can be listed because the legal entities had at least one attribute that matched the attributes entered by the user at the input field 202.

The attributes 304 can correspond to a legal name of found legal entities and the attributes 306 can correspond to a trade style name of found legal entities. The attributes 308 can correspond to a city associated with found legal entities and the attributes 310 can correspond to a state associated with found legal entities. Moreover, the attributes 312 can correspond a tax id associated with found legal entities. The attributes 314 can correspond to a status of found legal entities. While the attributes 304-314 are displayed in the user interface 300, other attributes mentioned herein can also be listed, or alternatively listed.

The user interface 300 can also include a drill down interface 316 that lists the attributes listed on the data record 302. For example, the drill down interface 316 lists attributes 318 that are associated with the found legal entities listed in the data record, such as the attributes 308, 310, and 314. The drill down interface 316 can function as a filter to sort the legal entities listed in the data record 302. More specifically, the attributes 318, such as the attributes 308, 310, and 314, are selectable, where selection of one, or any number of, the attributes 318 can filter the legal entities listed in the data record 302.

When one of the attributes, such as the attribute 308, is selected as a filter, the legal entities listed on the data record 302 can be rearranged based on the attribute selected in the drill down interface 316. Here, the legal entities are listed such that the legal entities having a location in the city of Fort Mill are listed first on the data record 302. While the attribute 308 is shown as being a filter to arrange how the legal entities are listed on the data record 302, any of the attributes 304-314 can be selected.

Figure 4:
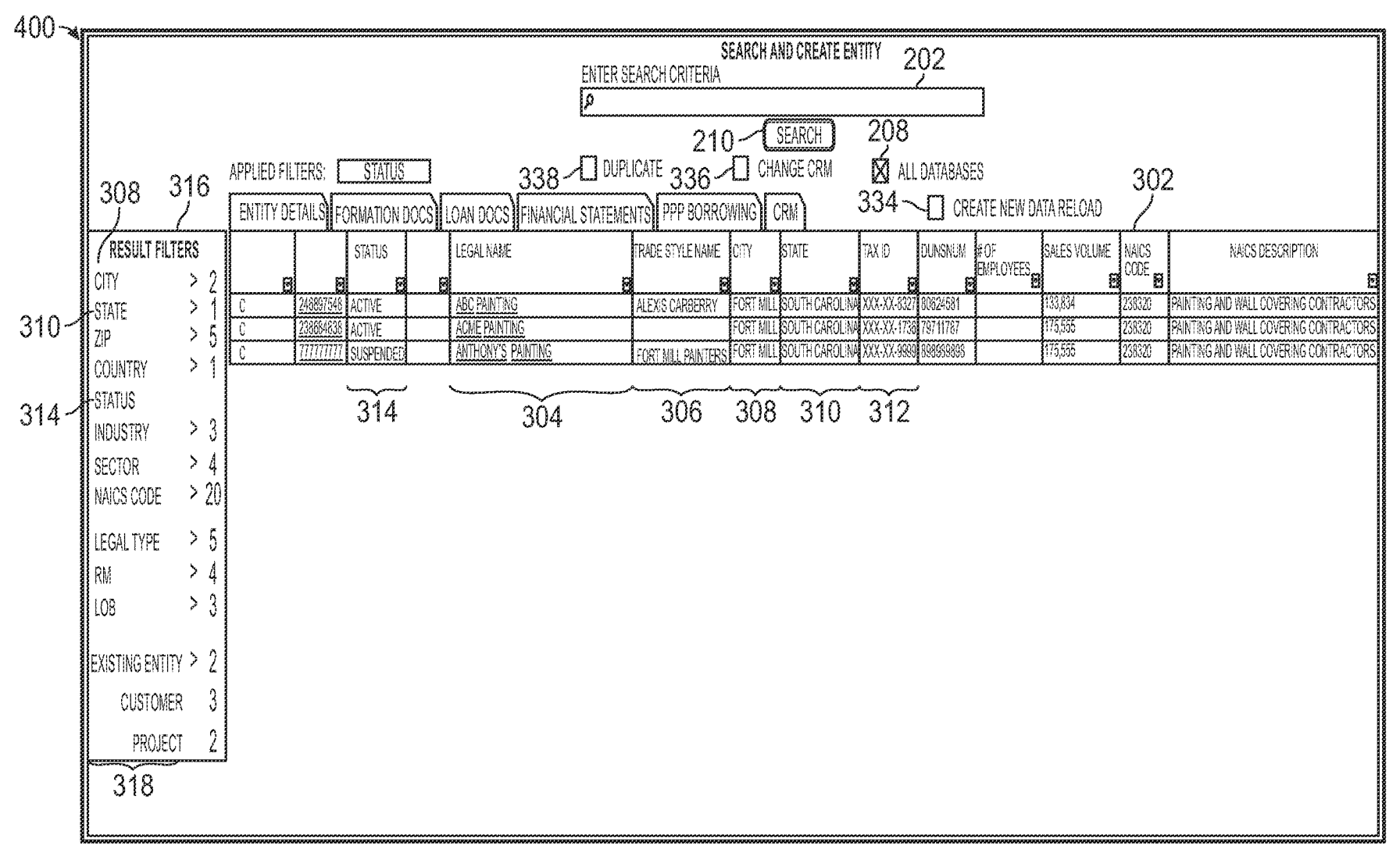

In further examples, when a user selects one of the attributes 318 in order to filter the legal entities listed in the data record 302, a user interface 400 can be presented as shown with reference to FIG. 4. The user interface 400 can display the legal entities in the data record according to whether or not the legal entities have the attribute 314 listed therewith. In particular, the attribute 314 can correspond to an attribute "status," which can relate to a status of the legal entity in relation to an organization. To further illustrate, if a user, such as the user who conduced the search via the user interface 200, is actively involved with the legal entity, such as performing activities for the legal entity, the attribute 314 can be listed as "active." On the other hand, if a user is currently not actively involved with the legal entity, such as if the legal entity has not provided remittance for work previously done, the attribute 314 can be listed as "suspended."

As discussed above, the internal databases 106 can store documents associated with legal entities. Returning attention to FIG. 3 and the user interface 300, when the search system 102 searches the internal databases 106, the search system 102 can also search for documents that are associated with found legal entities. When the search system 102 generates the user interface 300, the search system 102 can also provide links to documents associated with the found legal entities listed in the data record 302. For example, the user interface 300 can have tabs 320-330. The tabs 320-330 can provide a link to entity information for a selected legal entity. To further illustrate, if a CRM has the legal entity 332 selected, when the CRM selects the tab 322, formation documents associated with the legal entity 332 can be presented to the CRM.

In addition, to formation documents, such as those selectable via the tab 322, the tabs 320-330 can provide access to other information associated with a selected legal entity. Upon selection of the tab 320, entity information associated with the selected legal entity 332 can be presented. When selected, the tab 324 can provide loan information documents associated with the selected legal entity 332. The tab 326 can provide financial statements associated with the selected legal entity 332. The tab 328 can provide PPP borrowing documents associated with the selected legal entity 332. The tab 330 can provide information regarding a CRM who has a relationship with the selected legal entity 332. While entity information, formation documents, loan information documents, financial statements, and PPP borrowing documents are described as being associated with the legal entity tabs 320-330, any type of information, such as the information described above that can be stored at the internal databases 106, can be associated with the legal entity 320-328 where selection of the legal entity tabs will either present or provide access to the information associated with the selected tab. Moreover, the legal entity tabs can provide access or present information associated the selected legal entity 332 stored at the external databases 108.

The user interface 300 can display differences between the legal entities that match the query entered at the input field 202 in addition to similarities among the found legal entities. Regarding the differences, these can relate to location, such as different cities or states, different legal names, trade names, trade styles names, sales volume, or the like. While the user interface 300 shows a plurality of differences, the differences are not limited to what is shown therein. To further illustrate, the user interface 300 could show incorporation date, incorporation location, and the like.

As mentioned above, the tab 330 can provide information regarding a CRM who has a relationship with a selected legal entity. In some scenarios, the user submitting the search query at the input field 202 may decide that the CRM associated with the legal entity listed at the data record 302 is incorrect. To further illustrate, the user can be a CRM having a relationship with the searched legal entity while the CRM associated with the legal entity listed in the data record 302 can have a relationship with the legal entity listed in the data record 302. Scenarios can occur where there is a relationship between the searched legal entity and the listed legal entity. An example can be when the listed legal entity corresponds to a subsidiary of the searched legal entity. Here, the user conducting the search can request that the CRM associated with the listed legal entity be changed to the user. In particular, the user can select the change CRM option 336, which can allow the user to change the CRM associated with the listed legal entity.

Moreover, if the user feels that the data record 302 lists duplicate entries for a legal entity, the user can select a duplicate entry option 338. Upon selection of the duplicate entry option 338, a determination can be made if duplicate entries exist for the same legal entity and delete the duplicate. In some examples, the entities can optionally be linked in order to allow the CRM device 104 to deduplicate the entities when acting as a middleware device.

In examples, the legal entities listed on the data record 302 may not include the legal entity being searched for by the user. Therefore, the user can select the option 334 to create a new record, which allows the user to create a new data record for a legal entity. When the user selects the create new data record option 334, the search system 102 can present a user interface 500, as shown with reference to FIG. 5.

The user interface 500 can include input fields 502-506 that allow the user to enter information associated with the legal entity for which they previously conducted a search. In examples, rules can be implemented that relate to the information that is entered at the input fields 502-506. The rules can indicate minimum information that should be entered in order allow for consistent information across data records for different legal entities. To further illustrate, rules can be implemented that indicate that information, such as a name, a tax id, and an address, should be entered at the input fields 502-506 in order to allow for consistent information across data records for different legal entities. While a name, such as a legal name, a trade name of a legal entity, or a trade style name of a legal entity, a tax id, and an address can be required by the rules, any type of information, such as year of incorporation, state of incorporation, or the like, can be implemented by the rules.

After the user enters the information for the legal entity at the user interface 500, the search system 102 can conduct a second search at the internal databases 106 and the external databases 108 using the information entered at the user interface 500. The second search can be performed in order to confirm that no data records exist for the legal entity being searched by the user. Moreover, the second search can be performed to ensure that the first search did not miss a data record for the legal entity, i.e., serve as a backstop to the initial search. Here, if the search system 102 finds a data record for the legal entity using the information, the search system 102 can present the search results at the user interface 300 as described above.

Figure 6A:
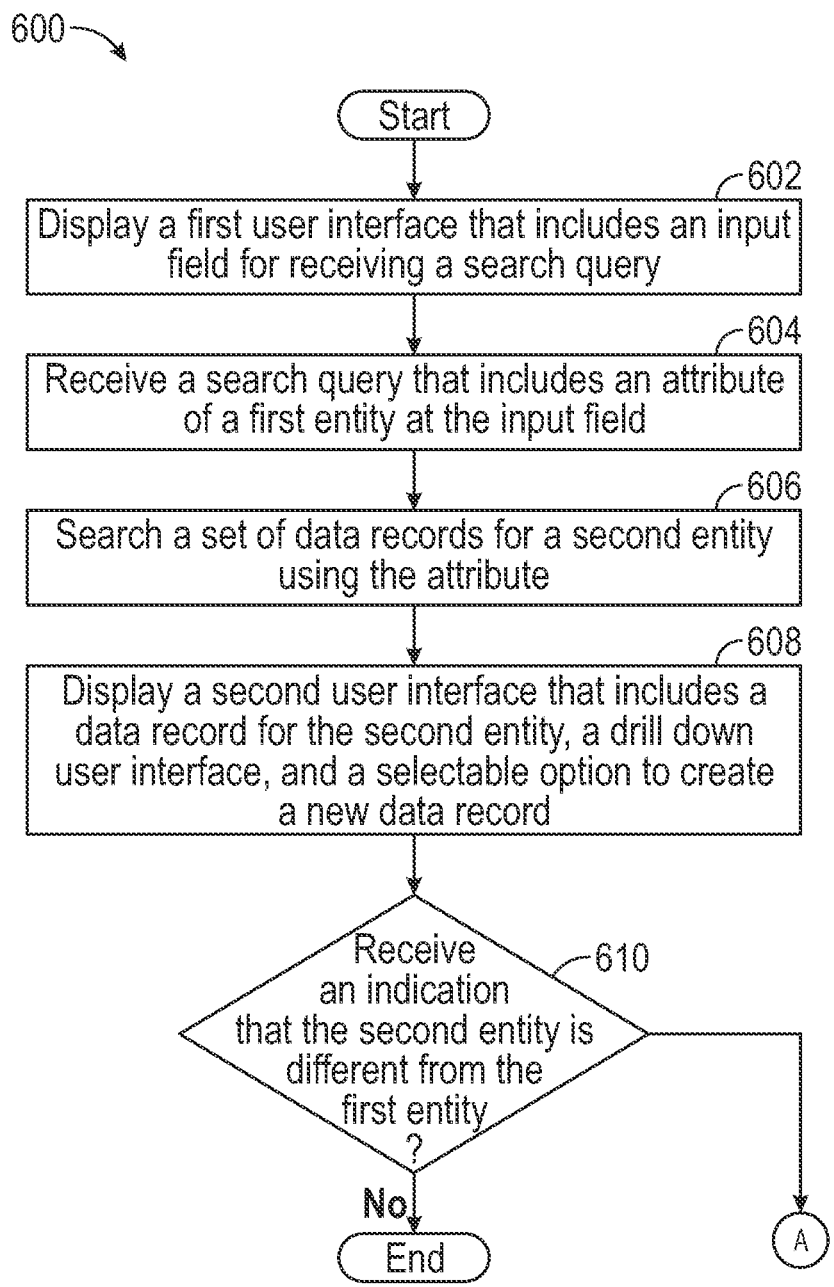
FIGS. 6A and 6B show a method for searching a legal entity, in accordance with some examples.

Now making reference to FIG. 6, a method 600 of searching for a legal entity is shown, in accordance with some examples. Initially, during an operation 602, a user interface that includes an input field for receiving a search query is displayed to a user. A user that desires to search for a legal entity can engage the user interface to commence the search for the legal entity. During an operation 604, a search query is received at the input field. The search query can include an attribute of a first entity. The first entity can be a legal entity as described above and the first attribute can correspond to one of the attributes 304-314. As an illustration of the method 600, referred to herein as "the illustration," a CRM could be searching for the legal entity "Maguire's Painting." In the illustration, during the operation 602, the user interface 200 is displayed on the CRM device 104. During the operation 604, a CRM associated with the CRM device 104 inputs a search query 212 that includes the attributes "Painting" and "South Carolina."

Returning attention to FIG. 6 and the method 600, after a search query is received during the operation 604, the method 600 performs an operation 606 where a set of data records are searched for a second entity using the attribute of the first entity. Databases, such as the internal databases 106 and the external databases 108, can be searched for second entities that include the attributes received at the input field during the operation 606. During the operation 606, metadata associated with the records for second entities can also be gathered. This metadata can include the author of the record and when the record was created, if any updates have been made, when the updates were made, the author of the updates, and the like. When second entities are found, the method 600 can perform an operation 608, where a second user interface is displayed. The second user interface can include a data record for the found second entities, a drill down user interface, and a selectable option to create a new data record.

Making reference again to the illustration, during the operation 606, the search system 102 searches the internal databases 106 and the external databases 108 for legal entities that include the attributes "Painting" and "South Carolina." The search system 102 then displays the user interface 300 on the display device 104 during the operation 608, as shown with reference to FIG. 3. In the illustration, as may be seen with reference to FIG. 3, legal entities having the attribute "painting," as shown with attribute 305, and the attribute "South Carolina," as shown with attribute 310, are displayed on the user interface 300. In particular, during the operation 606, the legal entities shown on the data record 302 were found since all of the legal entities include the attributes "Painting" and "South Carolina."

In the method 600, after the operation 608, a determination is made if an indication has been received regarding whether or not the second entity displayed in the second user interface is the same as the first entity in an operation 610. More specifically, a determination is made if a match was found during the operation 610. A determination regarding whether or not a match was found can be made by determining if the option to create a new data record on the second user interface presented during the operation 608 has been selected. If the option to create a new data record has been selected, this can be indicative of receiving an indication that the second entity is different from the first entity. If a match was found, then the method 600 is complete.

Otherwise, an operation 612 is performed where minimum information is received for the first entity Again, making reference to the illustration and the user interface 300, the CRM is searching for the legal entity "Maguire's Painting." The data record 302 did not include the legal entity "Maguire's Painting." Accordingly, the CRM selects the new data record option 334 such that an indication that the legal entities on the data record 302 did not include the legal entity "Maguire's Painting" is received during the operation 610. Therefore, the operation 612 can be performed.

Figure 5:
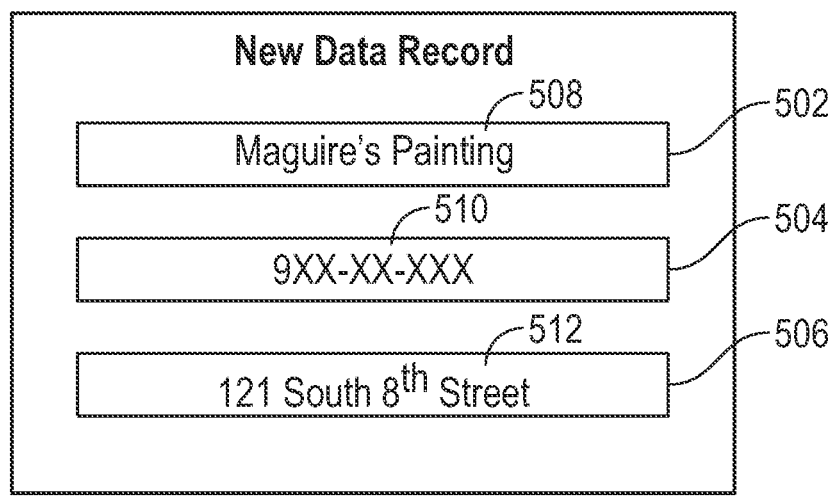
FIG. 5 is a user interface configured to receive information for a legal entity, in accordance with some examples.

Still sticking with the illustration and making reference to FIG. 5, during the operation 612, the CRM enters minimum information for the legal entity at the user interface 500. Here, rules indicate that the minimum information should include a legal name of the legal entity, a tax id of the legal entity, and a corporate address of the legal entity. Thus, during the operation 612, the CRM enters the legal name "Maguire's Painting" 508 at the input field 502, the tax id "9xx-xx-xxx" 510 at the input field 504, and the address "121 South 8th Street" 512 at the input field 506 during the operation 612.

Figure 6B:
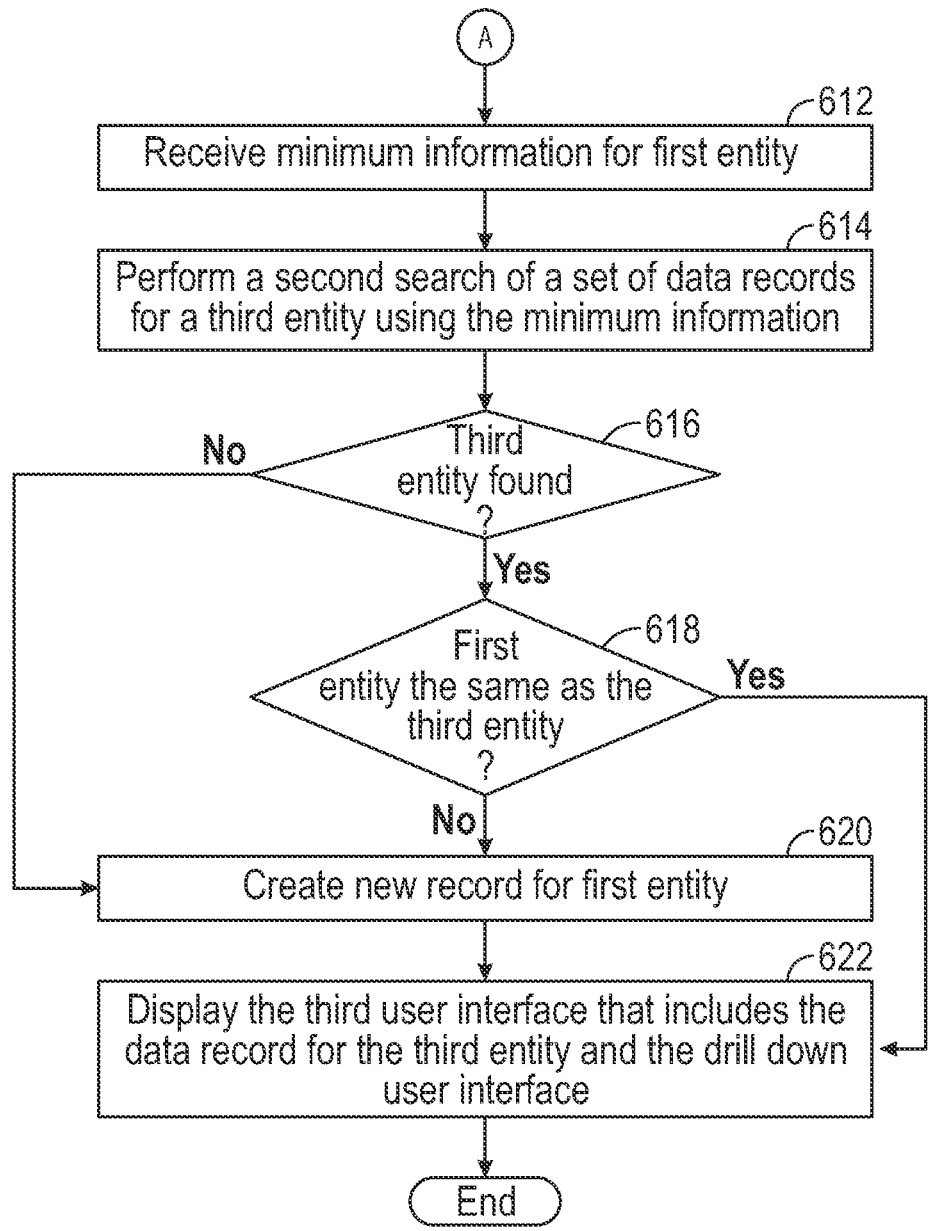

Making reference to FIG. 6B and the method 600, once the minimum information is received during the operation 612, an operation 614 is performed where a second search of a set of data records for a third entity is done using the minimum information. Similar to the operation 606, databases, such as the internal databases 106 and the external databases 108, can be searched for second entities that include the minimum information received during the operation 612. If a third entity is found that includes the minimum information, then an operation 618 can be performed, where a determination is made if the first entity is the same as the third entity.

If a determination is made that the third entity having the minimum information is not found or, alternatively, that third entities that have been found are not in fact the same of the first entity, then an operation 620 can be performed, where a new data record is created. The new data record can correspond to a new legal entity where a new internal database identifier can be created. In addition, the data record can be formed that includes the minimum information provided during the operation 612. Furthermore, the CRM can provide additional information related to the first entity, such as that discussed above with regards to the information that can be stored at the internal databases 106 and the external databases 108. Upon creation of the new record for the first entity, an additional review of the new record will be conducted after a given time period, such as twenty-four hours. The additional review can confirm that a new record should be created for the first entity. If the additional review determines a new record should be created for the first entity, the new record will be created and released. Releasing the new record of the first entity can include storage of the new record of the first entity in the internal databases 106 and/or storage of the new record of the first entity in the external databases 108. Alternatively, if, during the additional review, a determination is made that an exiting data record exists for the first entity, the minimum information provided during the operation 612 can be merged with the existing data record and the merged data record can be released as discussed above.

Returning to the illustration, during the operation 614, the search system 102 searches the internal databases 106 and the external databases 108 for legal entities having the legal name "Maguire's Painting" 508, the tax id "9xx-xx-xxx" 510, and the address "121 South 8th Street" 512. In the illustration, a determination is made during the operation 616 that neither the internal databases 106 nor the external databases 108 include the legal name "Maguire's Painting" 508, the tax id "9xx-xx-xxx" 510, and the address "121 South 8th Street" 512. Thus, the method 600 performs the operation 620, where a new record for the legal entity "Maguire's Painting" is created. Also, after twenty-four hours, an additional review of the new record corresponding to "Maguire's Painting" is conducted. In the illustration, during the additional review, a determination is made that a new record should be created for "Maguire's Painting." Thus, the new record for "Maguire's Painting" is released to the internal databases 106.

In the method 600, if, during the operation 618, a determination is made that the first entity is the same as the third entity, an operation 622 can be performed. In addition, if instead the operation 620 is performed, after completion of the operation 620, the operation 622 can be performed. During the operation 622, a third user interface that can include a data record for the found third entity, a drill down interface, and a selectable option to create a new data record is displayed.

Turning attention back to the illustration, a third user interface 700, as shown with reference to FIG. 7, is displayed that includes the legal entity "Maguire's Painting" Moreover, the user interface includes the minimum information corresponding to the tax id "9xx-xx-xxx" 510 and the address "121 South 8th Street" 512 (not shown). Upon completion of the operation 622, the method 600 is complete.

Figure 8:
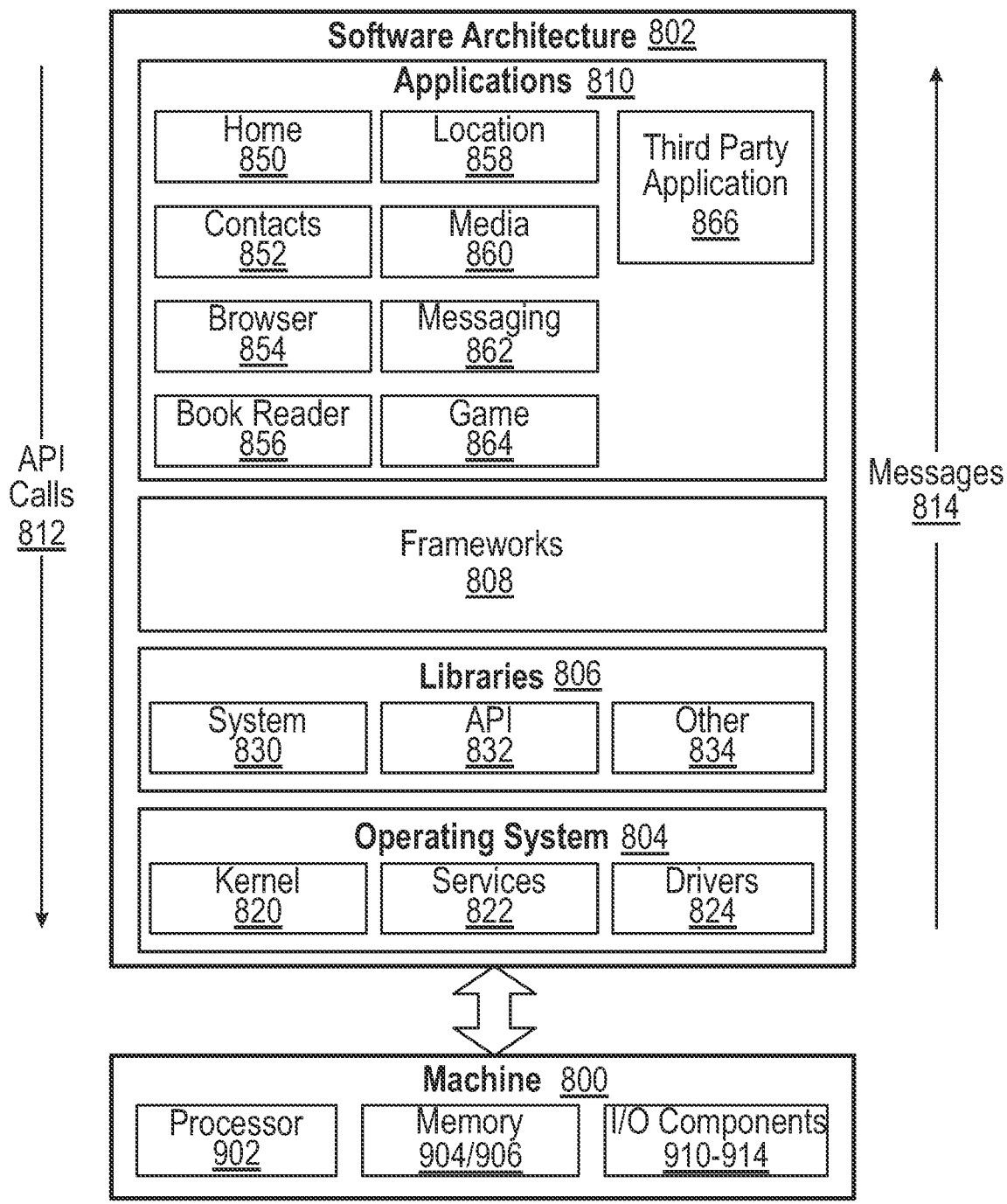
FIG. 8 is a block diagram illustrating an example of a machine upon which one or more examples may be implemented.

FIG. 8 is a block diagram 800 illustrating a software architecture 802, which may be installed on any one or more of the devices described above. FIG. 8 is merely a non-limiting example of a software architecture, and it will be appreciated that many other architectures may be implemented to facilitate the functionality described herein. The software architecture 802 may be implemented by hardware such as a machine 800 of FIG. 8 that includes a processor 802, memory 804 and 806, and I/O components 910-914. In this example, the software architecture 802 may be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, according to some implementations.

In various implementations, the operating system 804 manages hardware resources and provides common services. The operating system 804 includes, for example, a kernel 820, services 822, and drivers 824. The kernel 820 acts as an abstraction layer between the hardware and the other software layers in some implementations. For example, the kernel 820 provides memory management, processor management (e.g., scheduling), component management, networking, and security settings, among other functionality. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi™ drivers, audio drivers, power management drivers, and so forth.

In some implementations, the libraries 806 provide a low-level common infrastructure that may be utilized by the applications 810. The libraries 806 may include system libraries 830 (e.g., C standard library) that may provide functions such as memory allocation functions, string manipulation functions, mathematic functions, and the like. In addition, the libraries 806 may include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include a wide variety of other libraries 834 to provide many other APIs to the applications 810.

The frameworks 808 provide a high-level common infrastructure that may be utilized by the applications 810, according to some implementations. For example, the frameworks 808 provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

In an example, the applications 810 include a home application 850, a contacts application 852, a browser application 854, a book reader application 856, a location application 858, a media application 860, a messaging application 862, a game application 864, and a broad assortment of other applications such as a third-party application 766. According to some examples, the applications 810 are programs that execute functions defined in the programs. Various programming languages may be employed to create one or more of the applications 810, structured in a variety of manners, such as object-orientated programming languages (e.g., Objective-C, Java, or C++) or procedural programming languages (e.g., C or assembly language). In a specific example, the third-party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 866 may invoke the API calls 812 provided by the mobile operating system (e.g., the operating system 804) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 106 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (eg, an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 9:
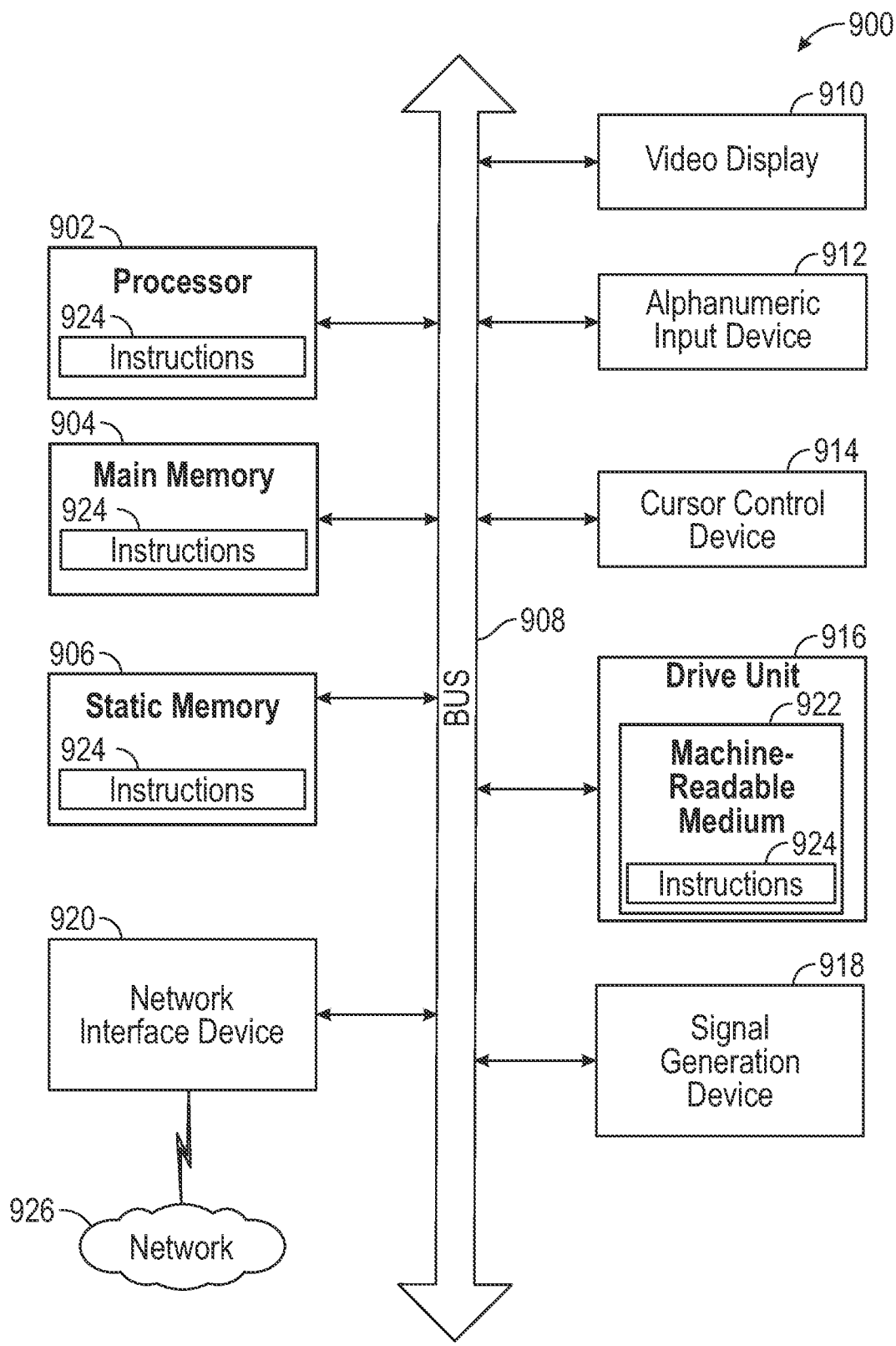
FIG. 9 illustrates a device that can be used to implement exemplary examples of the present disclosure.

FIG. 9 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 610 (e.g., a liquid crystal display (LCD) or a cathode ray tube (CRT)). The computer system 900 also includes an alphanumeric input device 912 (e.g., a keyboard), a user interface (UI) navigation device (cursor control device) 614 (e.g., a mouse), a disk drive unit 916, a signal generation device 918 (e.g., a speaker) and a network interface device 920.

The drive unit 916 includes a machine-readable medium 922 on which is stored one or more sets of instructions and data structures (e.g., software) 624 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. Instructions 924 may also reside within the static memory 906.

While the machine-readable medium 922 is shown in an example to be a single medium, the term "machine-readable medium" may include a single medium or multiple media (e.g., a centralized or distributed database, and/or associated caches and servers) that store the one or more instructions or data instructions 924. The term "machine-readable medium" shall also be taken to include any tangible medium that is capable of storing, encoding or carrying instructions 924 for execution by the machine and that cause the machine to perform any one or more of the methodologies of the present invention, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and WiMax networks) The term "transmission medium" shall be taken to include any intangible medium that is capable of storing, encoding or carrying instructions 924 for execution by the machine, and includes digital or analog communications signals or other intangible media to facilitate communication of such software.

In various example examples, one or more portions of the network 926 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 926 or a portion of the network 926 may include a wireless or cellular network, and the coupling 682 may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system comprising:
    processing circuitry; and
    a memory device including instructions embodied thereon, wherein the instructions, which when executed by the processing circuitry, configure the processing circuitry to perform operations that:
        cause a first user interface to be displayed on a personal dashboard, the first user interface including an input field configured to receive a search query;
        receive the search query at the input field, the search query including a first attribute of a first entity;
        search a set of data records for a second entity using the first attribute in response to receiving the search query;
        cause a second user interface to be displayed on the personal dashboard, wherein the second user interface replaces the first user interface on the personal dashboard, the second user interface including:
            a data record for the second entity found during the search of the set of the data records, the data record listing the first attribute and additional attributes of the second entity;
            a drill down user interface, the drill down user interface listing the first attribute and the additional attributes, wherein each of the first attribute and the additional attributes are selectable to reconfigure the second user interface; and
            a selectable option to create a new data record, the selectable option corresponding to an indication that the first entity is different from the second entity;
        receive a selection of one of the additional attributes;

reconfigure the second user interface in response to the selection of the one of the additional attributes;
receive a second attribute of the first entity;
create the new data record with the first attribute and the second attribute;
determine that an existing data record exists for the first entity after a time period based on creating the new data record; and
merge the existing data record with the second attribute such that the personal dashboard displays the second attribute on one of the first user interface or the second user interface.

2. The system of claim 1, wherein the instructions further configure the processing circuitry to:
receive the indication that the second entity is different from the first entity via the selectable option to create a new data record; and
perform a second search for the first attribute in response to receiving the indication that the second entity is different from the first entity.

3. The system of claim 2, wherein the instructions further configure the processing circuitry to confirm that the second entity is different from the first entity based on the second search.

4. The system of claim 2, wherein the instructions further configure the processing circuitry to confirm that the second entity is the same as the first entity based on the second search.

5. The system of claim 1, wherein the instructions further configure the processing circuitry to:
list additional data records associated with additional entities, each of the additional data records including the first attribute;
receive a selection of one of the first attribute or one of the additional attributes at the drill down user interface; and
cause a third user interface to be displayed in response to receiving the selection of one of the first attribute or the one of the additional attributes at the drill down user interface, the third user interface reorganizing the list of the additional data records with the additional entities.

6. The system of claim 1, wherein the instructions further configure the processing circuitry to:
list additional data records associated with additional entities, each of the additional data records including the first attribute, the additional entities each including a prospect; and
cause a third user interface to be displayed, the third user interface including an option to select the prospect based on a pre-existing association with the prospect.

7. The system of claim 1, wherein the instructions further configure the processing circuitry to:
list additional data records associated with additional entities, each of the additional data records including the first attribute;
determine that two of the data records of the additional data records are duplicates; and
delete one of the two data records in response to determining that the two of the data records are duplicates.

8. A non-transitory, machine-readable medium, comprising instructions, which when performed by a processor of a machine, causes the processor to perform operations to:
cause a first user interface to be displayed on a personal dashboard, the first user interface including an input field configured to receive a search query;
receive the search query at the input field, the search query including a first attribute of a first entity;
search a set of data records for a second entity using the first attribute in response to receiving the search query;
cause a second user interface to be displayed on the personal dashboard, wherein the second user interface replaces the first user interface on the personal dashboard, the second user interface including:
a data record for the second entity found during the search of the set of the data records, the data record listing the first attribute and additional attributes of the second entity;
a drill down user interface, the drill down user interface listing the first attribute and the additional attributes, wherein each of the first attribute and the additional attributes are selectable to reconfigure the second user interface; and
a selectable option to create a new data record, the selectable option corresponding to an indication that the first entity is different from the second entity;
receive a selection of one of the additional attributes;
reconfigure the second user interface in response to the selection of the one of the additional attributes;
receive a second attribute of the first entity;
create the new data record with the first attribute and the second attribute;
determine that an existing data record exists for the first entity after a time period based on creating the new data record; and
merge the existing data record with the second attribute such that the personal dashboard displays the second attribute on one of the first user interface or the second user interface.

9. The non-transitory, machine-readable medium of claim 8, wherein the instructions further cause the processor to perform operations to:
receive the indication that the second entity is different from the first entity via the selectable option to create a new data record; and
perform a second search for the first attribute in response to receiving the indication that the second entity is different from the first entity.

10. The non-transitory, machine-readable medium of claim 9, wherein the instructions further cause the processor to perform operations to confirm that the second entity is different from the first entity based on the second search.

11. The non-transitory, machine-readable medium of claim 9, wherein the instructions further cause the processor to perform operations to confirm that the second entity is the same as the first entity based on the second search.

12. The non-transitory, machine-readable medium of claim 8, wherein the instructions further cause the processor to perform operations to:
list additional data records associated with additional entities, each of the additional data records including the first attribute;
receive a selection of one of the first attribute or one of the additional attributes at the drill down user interface; and
cause a third user interface to be displayed in response to receiving the selection of one of the first attribute or the one of the additional attributes at the drill down user interface, the third user interface reorganizing the list of the additional data records with the additional entities.

13. The non-transitory, machine-readable medium of claim 8, wherein the instructions further cause the processor to perform operations to:

list additional data records associated with additional entities, each of the additional data records including the first attribute, the additional entities each including a prospect; and
cause a third user interface to be displayed, the third user interface including an option to select the prospect based on a pre-existing association with the prospect.

14. The non-transitory, machine-readable medium of claim 8, wherein the instructions further cause the processor to perform operations to:
list additional data records associated with additional entities, each of the additional data records including the first attribute;
determine that two of the data records of the additional data records are duplicates; and
delete one of the two data records in response to determining that two of the data records are duplicates.

15. A computer-implemented method comprising:
causing a first user interface to be displayed on a personal dashboard, the first user interface including an input field configured to receive a search query;
receiving the search query at the input field, the search query including a first attribute of a first entity;
searching a set of data records for a second entity using the first attribute in response to receiving the search query;
causing a second user interface to be displayed on the personal dashboard, wherein the second user interface replaces the first user interface on the personal dashboard, the second user interface including:
a data record for the second entity found during the search of the set of the data records, the data record listing the first attribute and additional attributes of the second entity;
a drill down user interface, the drill down user interface listing the first attribute and the additional attributes, wherein each of the first attribute and the additional attributes are selectable to reconfigure the second user interface; and
a selectable option to create a new data record, the selectable option corresponding to an indication that the first entity is different from the second entity;
receiving a selection of one of the additional attributes:
reconfiguring the second user interface in response to the selection of the one of the additional attributes;
receiving a second attribute of the first entity;
creating the new data record with the first attribute and the second attribute;
determining that an existing data record exists for the first entity after a time period based on creating the new data record; and
merging the existing data record with the second attribute such that the personal dashboard displays the second attribute on one of the first user interface or the second user interface.

16. The computer-implemented method of claim 15, the method further comprising:
receiving the indication that the second entity is different from the first entity via the selectable option to create a new data record;
performing a second search for the first attribute in response to receiving the indication that the second entity is different from the first entity; and
confirming that the second entity is different from the first entity based on the second search.

17. The computer-implemented method of claim 15, the method further comprising:
receiving the indication that the second entity is different from the first entity via the selectable option to create a new data record;
performing a second search for the first attribute in response to receiving the indication that the second entity is different from the first entity; and
confirming that the second entity is the same as the first entity based on the second search.

18. The computer-implemented method of claim 15, further comprising:
listing additional data records associated with additional entities, each of the additional data records including the first attribute;
receiving a selection of one of first attribute or the one of the additional attributes at the drill down user interface; and
causing a third user interface to be displayed in response to receiving the selection of one of the first attribute or the one of the additional attribute at the drill down user interface, the third user interface reorganizing the list of additional data records with the additional entities.

19. The computer-implemented method of claim 15, further comprising:
listing additional data records associated with additional entities, each of the additional data records including the first attribute, the additional entities each including a prospect; and
causing a third user interface to be displayed, the third user interface including an option to select the prospect based on a pre-existing association with the prospect.

20. The computer-implemented method of claim 15, further comprising:
listing additional data records associated with additional entities, each of the additional data records including the first attribute;
determining that two of the additional data records of the additional data records are duplicates; and
deleting one of the two data records in response to determining that two of the data records are duplicates.

* * * * *